United States Patent

Spann et al.

[11] Patent Number: 5,819,162
[45] Date of Patent: Oct. 6, 1998

[54] ELECTRO-MAGNETIC INTERFERENCE SHIELD FOR A TELEPHONE HANDSET

[75] Inventors: Charles L. Spann, Richardson; Michael J. Lynch, Allen, both of Tex.

[73] Assignee: Northern Telecom Limited, Montreal, Canada

[21] Appl. No.: 688,862

[22] Filed: Jul. 31, 1996

Related U.S. Application Data

[60] Provisional application No. 60/005,375 Sep. 29, 1995.
[51] Int. Cl.⁶ .................. H04B 1/38; H01Q 1/52
[52] U.S. Cl. .................. 455/90; 455/575; 455/550; 455/97; 455/106; 455/300; 379/428; 379/431; 379/437; 379/440; 379/52; 343/841; 343/851; 343/872; 361/818
[58] Field of Search .................. 455/90, 100, 550, 455/575, 300, 117, 95, 97, 106; 379/428, 430, 431, 437, 440, 52, 432, 433; 343/702, 841, 851, 872; 439/610; 361/814, 816–818

[56] References Cited

U.S. PATENT DOCUMENTS

| | | | |
|---|---|---|---|
| 4,464,792 | 8/1984 | Owerko | 455/128 |
| 5,336,896 | 8/1994 | Katz | 174/35 R |
| 5,550,552 | 8/1996 | Oxley | 455/90 |
| 5,564,085 | 10/1996 | Chen et al. | 455/90 |
| 5,613,221 | 3/1997 | Hunt | 455/90 |
| 5,614,694 | 3/1997 | Gorenz, Jr. et al. | 174/35 R |
| 5,657,386 | 8/1997 | Schwanke | 379/433 |

OTHER PUBLICATIONS

J. Ross Le Strange, et al., "Interference to Hearing Aids by the Digital Mobile Telephone System, Global System for Mobile Communications (GMS)", National Acoustic Labs Report No. 131, May 1995.

*Primary Examiner*—Donnie L. Crosland
*Attorney, Agent, or Firm*—Foley & Lardner

[57] ABSTRACT

An electromagnetic interference (EMI) shield for a handheld cellular phone that is particularly useful for shielding a hearing aid against EMI from the phone's antenna. The device includes a base and a flap laminated with a metallic shielding. The base attaches to the receiver end of the cellular phone and the flap rests over the base when the phone is not in use. In operation, the flap extends away from the base forming an enclosure about the user's ear for shielding the hearing aid from EMI when the phone is in use.

18 Claims, 4 Drawing Sheets

ELECTRO-MAGNETIC INTERFERENCE SHIELD FOR A TELEPHONE HANDSET

This application claims the benefit of U.S. provisional application No. 60/005,375, filed Sep. 29, 1995.

FIELD OF THE INVENTION

The present invention is directed to an electromagnetic interference (EMI) shield, and more particularly to a compact EMI shield for a hand-held cellular telephone.

BACKGROUND OF THE INVENTION

Interference to hearing aids is becoming key issue in the modern speech communication field and is getting new attention by regulators of the field in various countries. Interference between an active hearing aid and the digital signals received/emitted by a telephone antenna that is located in proximity to the hearing aid when the telephone is in use is generally severe enough to prevent most hearing aid users from talking on a hand-held cellular telephone, if the telephone is placed on the ear with an active hearing aid. Shielding and circuit design for future hearing aids may permit many users with an active hearing aid on the ear to talk on a digital telephone, but until now there has been no solution for most existing hearing aids with poor shielding or poor circuit design to minimize or eliminate digital interference.

For the GSM system (Group Special Mobile, a standard for pan-European mobile communications), the radio spectrum available for transmission is between 800 and 950 MHz. GSM uses a time division multiple access (TDMA) signal structure, where the carrier is pulsed and has a higher peak power than the present analog mobile telephone system. The digital pulse makes the GSM system much more likely to cause interference with electronic equipment which is apparently not affected by analog RF fields. Other digital systems have the potential for similar interference. Commercial digital systems tested with hearing aids have shown similar levels of interference, at similar handset power levels.

Interference is of particular concern to hearing aid wearers who wish to use digital wireless telephones, when the hearing aid is in proximity to the telephone antenna. The higher the peak pulses of RF power radiated in close proximity to the hearing aids where they will normally be used, the more severe the interference. The hearing aids may demodulate the radio frequency (RF) envelope and produce a constant distinctive buzzing sound, overpowering all other signals.

The degree of interference or immunity varies with the hearing aid type and the relative orientation of the hearing aid and the telephone. Interference occurs generally across the usable range from 200 to over 5000 Hz.

It has been determined experimentally that interference occurs at the most sensitive part of the hearing aid amplifier, where the RF field induces signals in the wires connected to the microphone or the telecoil, which signals are then detected (rectified) by the transistor input and possibly by the output of the microphone which has a simple buffer amplifier.

In some aids, filters are used to shunt the amplifier input to prevent RF signals being detected and heard by the wearer. Often times the filter is a capacitor. However, use of capacitors is restricted because of their effect on circuit operation, as well as taking up valuable space.

Some other hearing aids use much shorter microphone leads for reducing interference. This may be obtained by mounting the microphone next to the amplifier board.

There are also attempts to shield the aid. Complete shielding of the whole hearing aid with a conductive sheath could importantly reduce the interference. Shielding existing aids is difficult and may be impractical for some aids, however, shielding future aids appears to be a solution for some types of aids. Effective hearing aid shielding is highly dependent on avoiding gaps between the shield and the aid. Suitable methods include thin metallic coating on the inside of the case parts, impregnation of the plastic parts with fine conducting particles and using a "metallic" paint. However, it is likely to be impossible to completely shield all types of hearing aids and connecting leads for audio input and induction pick-up coil (telecoil) that are not shielded would present a problem.

Another issue to be considered is that even if future hearing aids were manufactured with shielding, changes to the large number of existing hearing aids may be logistically difficult, if not impractical. In addition, feasible modifications are likely to be of minimal effectiveness, because of the difficulty in applying effective remedial treatment to existing hearing aids. This may also be very expensive.

Restricting the use of the new digital mobile telephones will prevent interference, but would probably make the digital system useless.

Studies have been published in Europe and Australia that focus on the interference to hearing aids by the GSM based wireless systems. All these studies have found that commercial GSM based systems cause interference to hearing aids. Commercial digital systems in America have similar interference, but there are no published studies.

In Australia, GSM interference to hearing aids has been a frequent issue in publications. Some studies have evaluated shielding the hearing aids. The National Acoustic Laboratories (Australia) conducted a comprehensive shielding evaluation, which concluded that shielding of future hearing aids is possible, but that shielding existing aids is not practical.

In Europe, the European Community will require new hearing aids to be shielded to an immunity of 10 v/M, probably in 1996. This demand is in response to the interference problem with GSM.

In the United States, the Federal Communications Commission (FCC) is very concerned that new wireless systems such as GSM may not be usable by the hearing impaired. The FCC has recently received a petition to remove the "hearing aid compatible" exemption for broadband Personal Communication Service (PCS) systems. The FCC provided a comment and reply comment period for interested parties to respond to the petition. Documents filed during the proceedings included many studies on digital interference and efforts to shield existing hearing aids from digital interference. These studies consistently conclude that it is not feasible to provide existing hearing aid users with the ability to use digital telephones on the ear with an active hearing aid by shielding the existing aids. The ability to provide an inexpensive shield to EMI will bring voice communication to hearing aid users that otherwise could not use some digital wireless systems.

Although some communications asserted that new heavily shielded hearing aids could be used with digital handsets, no previous solution has identified an effective method to shield the handset and make communication possible for owners of susceptible hearing aids.

The prevailing view is that shielding on the handset would not resolve interference to hearing aids.

There is a need for a realistic solution for minimizing the inconveniences that affect hearing aid users and which may make existing hearing aids useless for the new GSM mobile.

SUMMARY OF THE INVENTION

It is an object of the present invention to offer a compact, inexpensive solution to the above problems.

Another object of the present invention is to provide a hearing aid shield for a hand-held cellular telephone that will minimize detectable interference by a user who holds the telephone to the ear with an active hearing aid.

It is another object of this invention to provide a shield for attachment on existing hand-held cellular telephones so as to permit users of the current poorly shielded hearing aids to use such a telephone.

Yet another object of this invention is to provide a shield designed to effectively protect the hearing aid and reduce the RF shielding gaps that occur with other shield designs.

Accordingly, the invention is directed to a device for providing an electromagnetic interference (EMI) protected zone comprising a base for attachment to a hand-held cellular telephone; a flap comprising a metallic shielding laminated material; and means for coupling the flap to the base for allowing displacement of the flap between a storage mode when the flap rests over the base, and an operating mode when the flap extends away from the base to form the EMI protected zone about a user's ear.

According to another aspect, the invention is directed to a device for shielding a hearing aid against electromagnetic interference (EMI) comprising a base for attachment to a hand-held cellular telephone; a flap comprising a metallic shielding laminated material; and means for coupling the flap to the base for allowing displacement of the flap between a storage mode when the flap rests over the base, and an operating mode when the flap extends away from the base to form an EMI protected zone about a user's ear.

An advantage of the present invention is that the device fits against the user's head and effectively shields the hearing aid from EMI. The device of the present invention provides a better shielding of the hearing aid in comparison to the flat shields which have gaps where the signal can came around the shield face and interact adversely with the aid.

Another advantage of the device of this invention is that it provides flexibility for the user to adjust the shield for optimum performance.

Still another advantage is that the user may adjust the distance from the ear without compromising the ability for the shield to be in contact with the head and shielding the aid below. The ability to adjust distance is important to some users that would otherwise experience feedback noise, inhibiting good communication.

BRIEF DESCRIPTION OF THE DRAWINGS

The present invention will be described in the following, with reference to with attached drawings, in which:

FIG. 3b is a cross-section in the shield base along line A—A of FIG. 3a;

FIG. 4b shows a cross-section in the shield flap along line B—B of FIG. 4a;

DESCRIPTION OF THE PREFERRED EMBODIMENT

Laboratory measurements have been carried out in Australia by Telecom Research Laboratories and by National Acoustic Laboratories. In these measurements, the field strength level causing a useful "annoyance" threshold level of 10 dB above the noise floor of the hearing aid was measured and then compared to a measured field strength of 2 W and 8 W GSM to determine the distances where the threshold levels can be expected. Both behind-the-ear and in-the-ear types of hearing aids were measured.

Figure 1:
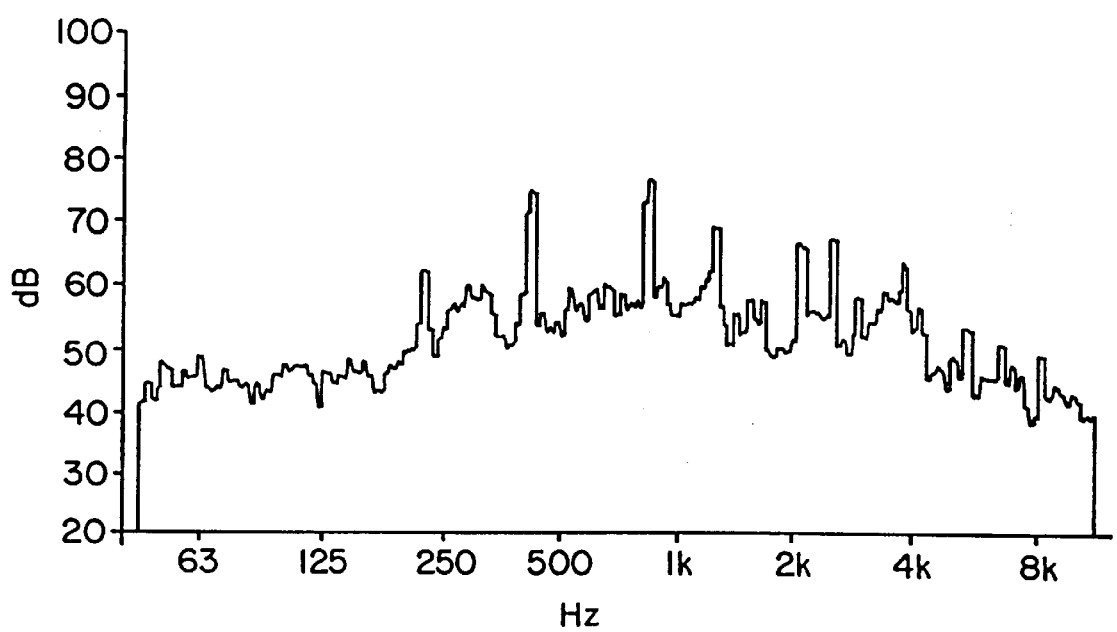
FIG. 1 is a sample frequency spectrum of a hearing aid output with interference.

FIG. 1 illustrates a typical frequency spectrum of the output of a hearing aid with interference which occurs across the range from 200 to over 5000 Hz (The National Acoustic Laboratory Report No. 131, Australian Hearing Services 1995).

Figure 2:
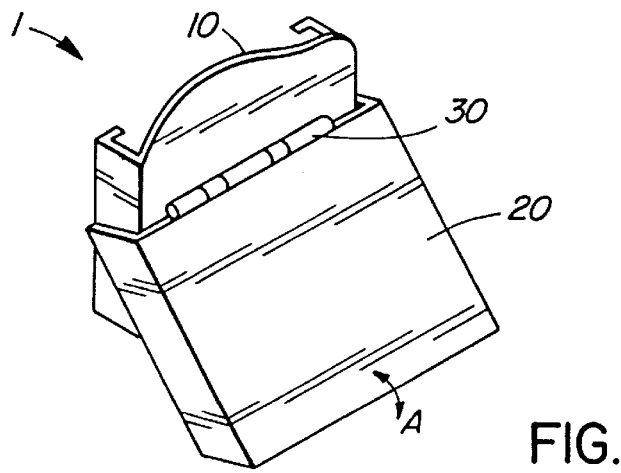
FIG. 2 is a perspective view of the shield of the present invention.

FIG. 2 shows a shield 1 according to the invention, which comprises a base 10 and a flap 20 assembled with connecting means 30. The shield is custom-designed for various types of hand-held cellular telephones, according to the architecture of the receiving end of the respective telephone.

Base 10 is designed for detachable mounting on the receiver end of a hand-held cellular telephone, on the front face with the speaker holes and the dial. The primary role of the base 10 is to attach the shield 1 to the telephone. The dimensions of the base 10 are therefore mainly determined by the width of the handset on which it is installed and by the a distance between the front edge and the display/keypad of the telephone. Namely, the base should leave the display and any keys that may be present in the receiver area of the telephone uncovered.

Another role of the base 10 is to form, with the flap 20, an extended EMI protected zone about the user's ear. The protected zone is defined herein as a zone where the EM field strength levels is under the "annoyance" threshold level of approximately 10 bB above the noise floor. Thus, the base may comprise a metallic laminated material placed between two layers of insulating material. Alternatively, the telephone may be built with such a shielding at the receiving end. When base plate 10 contains the metallic laminate, the size and design of base 10 is generally dictated by two constraints. It is important to use a plate as large as permitted by the architecture of the receiving end. If the plate is large, the resulting shielding area is also large. On the other hand, it is important that the base plate does not extend over the edges of the phone housing, for maintaining the compactness of the product.

The flap 20 comprises a metallic laminated material placed between two layers of insulating material. The flap can be displaced between a closed, or storage mode and an open, or operating mode. Arrow A shows how flap 20 moves between the storage mode, when it covers base 10, and the operational mode when it is positioned between the antenna and the user's head. The relative positions of the flap and base mounted on the handset are illustrated in more detail in FIGS. 5 and 6. Flap 20 is dimensioned so as to extend over the length of the telephone antenna in operation, to separate the EMI protected zone from the antenna.

A linear hinge is illustrated in the accompanying drawings, but it should be understood that the invention is not limited to the use of a linear hinge, other suitable connection means 30 may be used in place of the linear hinge. The role of the connecting means is to allow movement of the flap 20 between the storage and operating modes. The connecting means also allows the flap to be positioned conveniently about the user's ear, while the receiver side of the hand-held cellular telephone is positioned for effectively receiving the speech signals. The angle between the base 10 and flap 20 may be conveniently varied for obtaining the best operating position of the flap on a trial basis.

Locking means are also provided so that the flap 20 readily snaps over base 10 when the shield is stored. Various locking means may be envisaged by one skilled in the art; a preferred embodiment will be disclosed shortly.

Figure 3A:
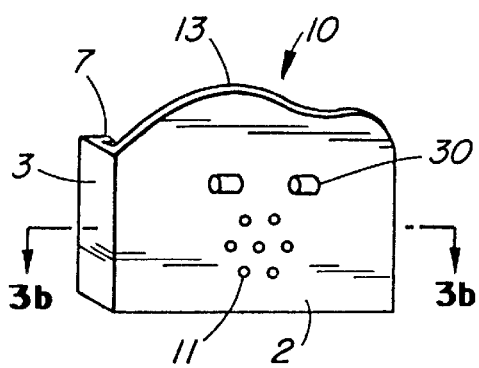
FIG. 3a is a perspective view of a shield base.
Figure 3B:
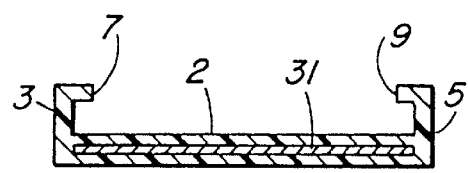
Figure 6:
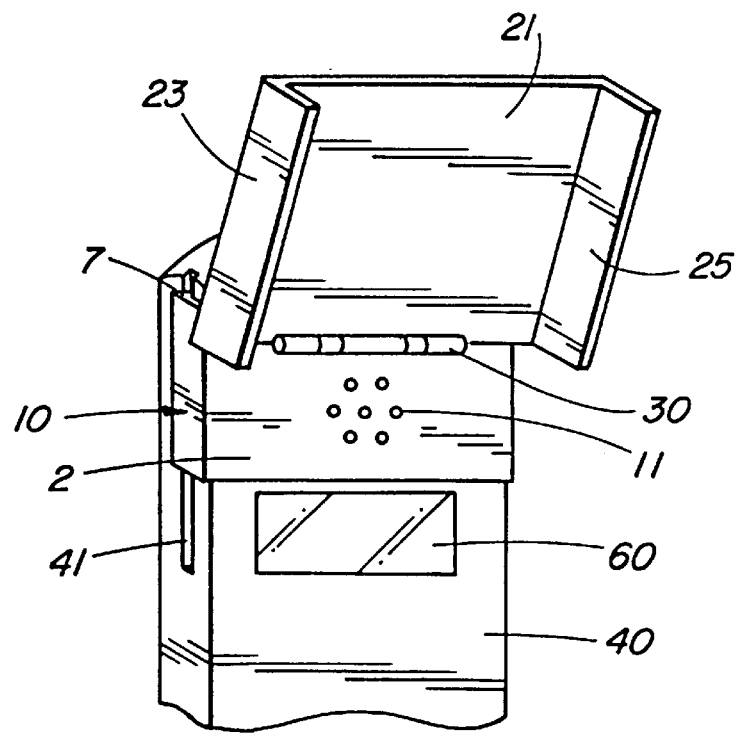
FIG. 6 illustrates a perspective front view showing the hand-held cellular telephone with the shield in the operating mode.

FIGS. 3a and 3b illustrate a preferred embodiment of the shield base. Base 10 has a shallow C-shape defined by a rigid base plate 2 and attaching means 3 and 5 for removably attaching base 10 to the receiving end of the telephone. Plate 2 is molded to fit over the receiver section of a hand-held cellular telephone. Plate 2 has a generally rectangular shape and is defined by a front side 13, a back side 15 and two lateral sides. Preferably, the front side 13 has a shape substantially similar to the shape of the transversal frontal edge of the telephone set. The width of plate 2 is determined by the width of the telephone set, while the length of plate 2 is determined by the architecture of the receiving end. As indicated above, plate 2 extends from the edge of the handset to the video display 60, to leave the display and any keys uncovered, as shown in FIG. 6.

Plate 2 is provided with perforations 11 for allowing passage of sound waves emitted by the speaker, when the shield is installed on the handset.

In the embodiment illustrated herein, the attaching means comprises two brackets 3 and 5 arranged along lateral sides of base 2 at an angle of approximately 90°. Brackets 3 and 5 have a L-shaped cross-section with side clips 7 and 9 extending along the entire length of the brackets. When the base is installed on the telephone, side clips 7 and 9 are inserted in a groove provided in the handset, as will be explained shortly in further detail. Other means for attaching plate 2 to the receiver end of the hand held cellular telephone 40 may be envisaged, without departing from the scope of this invention.

Figure 4A:
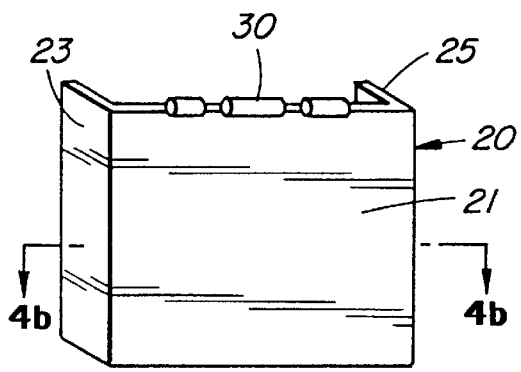
FIG. 4a is a perspective view of a shield flap.

Hinge 30 is shown in both FIGS. 3a and FIG. 4a, to better illustrate how the base 10 and the flap 20 are joined to form shield 1. It is apparent that hinge 30 is installed on plate 2 between side 13 and holes 11 and as close as possible to side 13 for maximizing the protected zone. As disclosed above, hinge 30 is oriented generally transverse to the sides 3 and 5, and allows flap 20 to revolve between a storing mode and an operating mode.

FIG. 3b shows a cross-section in the base 10 along line A—A illustrated in FIG. 3a. Base 10 is preferably molded plastic. Reference numeral 31 indicates a metallic layer that is provided inside the plate 2 which in fact forms the shield against EMI. Shielding 31 extends within plate 2 in this example, but it can also be provided within the housing of the hand-held cellular telephone. Preferably, shielding 31 is a copper layer.

Figure 4B:
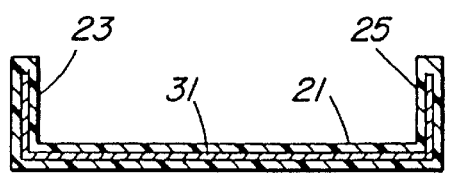

Flap 20 is illustrated in FIGS. 4a and 4b. The flap has a U-shape formed by a panel 21 and two side wings 23 and 25. The length of panel 21 is selected so as to extend over the length of the handset antenna when the flap is open. Wings 23 and 25 form an angle of approximately 90° with panel 21. As seen in FIG. 2, and especially in FIG. 7, hinge 30 allows flap 20 to extend in front of the antenna 50 when the hand-held cellular telephone is in operation.

FIG. 4b shows a cross-section in the flap 20, taken along line B—B shown in FIG. 4a. Flap 20 is preferably molded plastic. A metallic shielding 33 is laminated within panel 21 and wings 23 and 25 of flap 20. The metallic shielding of the flap is preferably a copper sheet. Good results were obtained with a copper sheet having an approximate thickness of heavy letter bond paper. Other metals and metal alloys may also be used.

The primary role of the flap 20 is to form the EMI protected zone which is defined by the metallic laminated material 33 provided in panel 21, wings 23 and 25, and the metallic laminate 31 provided in the base area. As the laminated material 33 extends within wings 23 and 25, fewer gaps are left between the shield and the antenna than with the prior art shields.

The secondary role of the flap 20 is to carry the locking means for keeping the shield closed in the storage mode. In the embodiment illustrated herein, the width of panel 21 is selected to be slightly larger than that of base plate 2 so that it can readily snap over base 10 when the wings 23 and 25 are pressed over brackets 3 and 5. Any other means for releasably locking the flap over the base in the storage mode may be provided.

Figure 5:
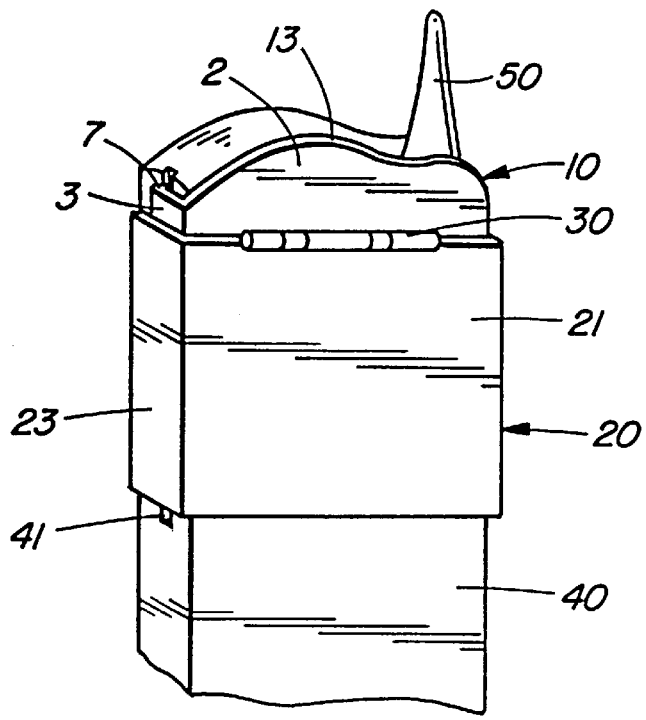
FIG. 5 is a perspective front view showing a hand-held cellular telephone with the shield in the storage mode.

FIG. 5 illustrates the shield fixed on a hand-held cellular telephone 40 and closed, with flap 20 resting over base 10. Panel 21 rests over base plate 2, and wings 23 and 25 rest over the respective lateral brackets 3 and 5 of base 2, forming a compact structure. Base 10 is attached to handset 40 by inserting clips 7 and 9 in grooves 41, machined on the lateral sides of the handset. As seen on FIG. 5, the plate 2 extends up to the edge of telephone 40, so that the side 13 and front edge of the telephone are superposed.

Preferably, when the flap is closed, panel 21 extends over display 60 of the handset (see FIG. 6), and wings 23 and 25 cover the lateral sides of the handset. In this way, the handset equipped with the EMI shield 1 is easy to store in that it does not have protruding parts and generally maintains the overall size of the handset.

FIG. 6 shows a front perspective view of the shield 1 fixed on the hand-held cellular telephone 40 with the flap open. It is apparent that flap 20 is long enough to block the radiation from antenna 50. Base 10 is installed with the base plate 2 arranged over the receiver end of the hand-held cellular telephone 40 with sides 3 and 5 partially covering the sides of the handset. Clips 7 and 9 catch on grooves 41 so that the base 10 is fixed to the handset. Openings 11 provide a path for the sound waves emitted by the speaker. Hinge 30 allows flap 20 to be positioned so as to obtain optimal shielding.

Figure 7:
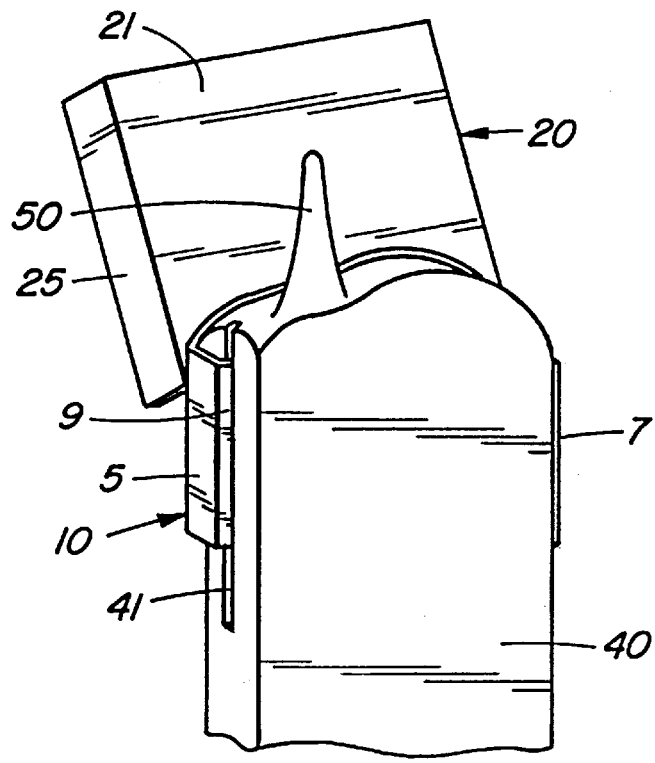
FIG. 7 illustrates a perspective back view of a hand-held cellular telephone with the shield in the operating mode.

FIG. 7 shows a back perspective view of the shield 1 mounted on handset 40 and positioned in operating mode. It can be seen how the length of flap 20 is selected to separate the antenna 50 from the ear zone, for reducing interference between the waves radiated by the antenna and the hearing aid.

Figure 8:
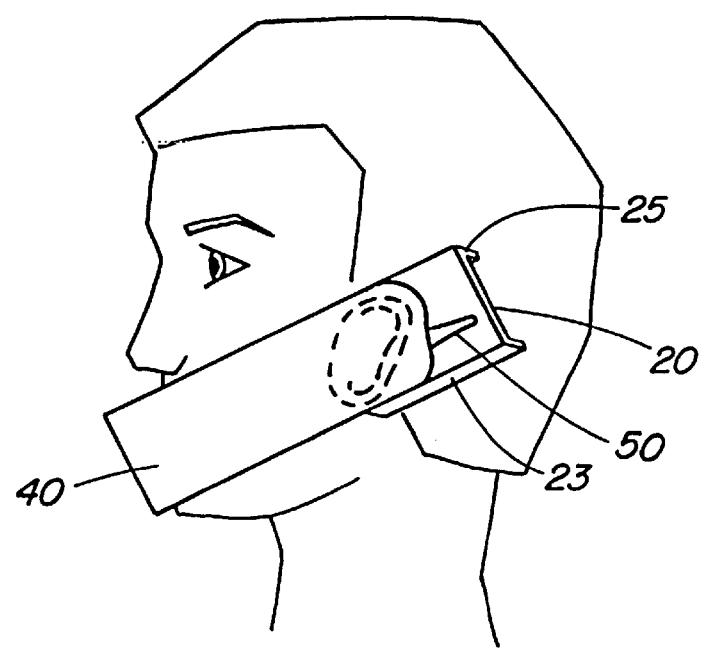
FIG. 8 shows the hand-held cellular telephone with the shield positioned against a user's head.

FIG. 8 shows the handset with the shield of the invention in use. The base plate 2 (not visible on FIG. 8) and the panel 21, together with the wings 23 and 25 of the flap, form a protected zone about the user's ear, which shields the hearing aid against radiation from the antenna.

The shield of this invention may be attached to the face of existing portable telephone handsets, or built into new portable telephone handsets. The base and the flap can be designed to fit on variously sized handsets currently in use.

While a preferred embodiment is disclosed and illustrated herein, it will be understood that the invention may be otherwise embodied within the true spirit and scope of the invention, as defined by the appended claims.

What is claimed is:

1. A device for providing an electromagnetic interference (EMI) protected zone comprising:

a base for attachment to a hand-held cellular telephone;

a flap comprising a metallic shielding laminated material; and means for coupling said flap to said base for allowing displacement of said flap between a storage mode when said flap rests over said base, and an operating mode when said flap extends away from said base to form said EMI protected zone about a user's ear.

2. A device as claimed in claim 1, wherein said base comprises a metallic shielding laminated material placed between two layers of insulating material.

3. A device as claimed in claim 1, wherein said base comprises:

a generally rectangular flat base plate defining two lateral sides, a front side and a back side; and means for attaching said base plate to the receiver end of said telephone.

4. A device as claimed in claim 3, wherein said base comprises a metallic shielding laminate material placed between two layers of insulating material, and said laminate extends over substantially the entire area of said base plate.

5. A device as claimed in claim 4, wherein said laminate has a thickness of heavy letter bound paper.

6. A device as claimed in claim 3, wherein said means for attaching is a pair of brackets, each provided at a lateral side of said base plate.

7. A device as claimed in claim 1, wherein said flap comprises:

a generally rectangular flat panel defining two lateral edges, a hinging edge and a free edge; and a pair of wings, each provided at a lateral edge of said panel and generally oriented perpendicular to said panel.

8. A device as claimed in claim 1, wherein said metallic shielding laminated material of said flap is placed between two layers of insulating material, and said laminate extends over substantially the entire area of said panel and said wings.

9. A device as claimed in claim 1, wherein said device further comprises means for locking said flap over said base in said storage mode.

10. A device for shielding a hearing aid against electromagnetic interference (EMI), comprising:

a base for attachment to a hand-held cellular telephone;

a flap comprising a metallic shielding laminated material; and means for coupling said flap to said base for allowing displacement of said flap between a storage mode when said flap rests over said base, and an operating mode when said flap extends away from said base to form an EMI protected zone about a user's ear.

11. A device as claimed in claim 10, wherein said base comprises a metallic shielding laminate material laced between two layers of insulating material.

12. A device as claimed in claim 10, wherein said base comprises:

a generally rectangular flat base plate defining two lateral sides, a front side and a back side, said base plate being sized to extend over the front face of the receiver end of said telephone, between a front transverse edge and a display of said telephone; and means for attaching said base plate to the receiver end of said telephone.

13. A device as claimed in claim 12, wherein said means for attaching is a pair of brackets, each provided at a lateral side of said base plate.

14. A device as claimed in claim 10, wherein said base comprises a metallic shielding laminate material placed between two layers of insulating material, and said laminate extends over substantially the entire area of said base plate.

15. A device as claimed in claim 10, wherein each said bracket is provided with a clip sized to catch on a corresponding groove provided on a respective lateral side of said receiver end.

16. A device as claimed in claim 10, wherein said flap comprises:

a generally rectangular flat panel defining two lateral edges, a hinging edge and a free edge, said panel being dimensioned to extend over the antenna of said telephone, when in operating position; and a pair of wings, each provided at a lateral edge of said panel and generally oriented perpendicular to said panel, said wings in combination with said panel providing said EMI protected zone, when said telephone is in use.

17. A device as claimed in claim 16, wherein said metallic shielding laminated material of said flap is placed between two layers of insulating material, and said laminate extends over substantially the entire area of said panel and said wings.

18. A device as claimed in claim 17, wherein said laminate has a thickness of heavy letter bound paper.

* * * * *